United States Patent
Tomioka et al.

(10) Patent No.: US 9,298,042 B2
(45) Date of Patent: Mar. 29, 2016

(54) LIQUID CRYSTAL DISPLAY DEVICE

(75) Inventors: Yasushi Tomioka, Hitachinaka (JP);
Noboru Kunimatsu, Chiba (JP);
Takeshi Sato, Kokubunji (JP); Masaki Matsumori, Tokai (JP)

(73) Assignee: JAPAN DISPLAY INC., Tokyo (JP)

( * ) Notice: Subject to any disclaimer, the term of this patent is extended or adjusted under 35 U.S.C. 154(b) by 210 days.

(21) Appl. No.: 13/442,925

(22) Filed: Apr. 10, 2012

(65) Prior Publication Data

US 2012/0268678 A1 Oct. 25, 2012

(30) Foreign Application Priority Data

Apr. 22, 2011 (JP) ................................ 2011-095969

(51) Int. Cl.
*G02F 1/136* (2006.01)
*G02F 1/1337* (2006.01)
*G02F 1/1343* (2006.01)
*G02F 1/1362* (2006.01)

(52) U.S. Cl.
CPC ........ *G02F 1/133707* (2013.01); *G02F 1/1343* (2013.01); *G02F 1/134309* (2013.01); *G02F 1/134336* (2013.01); *G02F 1/136227* (2013.01)

(58) Field of Classification Search
CPC ................................................ G02F 1/136227
USPC .......................................................... 349/147
See application file for complete search history.

(56) References Cited

U.S. PATENT DOCUMENTS 7,903,219 B2 * 3/2011 Sakurai et al. ................. 349/138
8,552,433 B2 * 10/2013 Nagami ............ G02F 1/136227
257/72
2007/0298538 A1 * 12/2007 Tanabe .............. G02F 1/136213
438/107
2009/0046230 A1 2/2009 Sakurai et al.
2009/0322975 A1 12/2009 Song et al.
2009/0323005 A1 * 12/2009 Ota ................................ 349/143
2010/0066961 A1 * 3/2010 Matsui et al. .................. 349/129
2010/0271582 A1 * 10/2010 Yamakawa et al. ........... 349/138

FOREIGN PATENT DOCUMENTS

| CN | 101369081 | 2/2009 |
|---|---|---|
| JP | 2009-47839 | 3/2009 |
| JP | 2010-8999 | 1/2010 |

OTHER PUBLICATIONS

English Translation of Office Action in connection with corresponding Chinese Patent Application No. 2012101288708, mailed Jun. 5, 2014.

* cited by examiner

*Primary Examiner* — Jessica M Merlin
*Assistant Examiner* — Mark Teets
(74) *Attorney, Agent, or Firm* — TYPHA IP LLC

(57) ABSTRACT

An object of the present invention is to enhance transmissivity and the luminance of a screen in an IPS liquid crystal display device. To achieve the object, in the IPS liquid crystal display device according to the present invention, a counter electrode is formed flatly and solidly on an organic passivation film, a pixel electrode having a slit is formed on the counter electrode via an interlayer insulation film, and an alignment film the orientation of which is controlled by optical orientation is formed on the pixel electrode. The transmissivity is enhanced by also making the inside of the contact hole function as a transmissible area for image formation by applying optical orientation to the alignment film in the contact hole to result in enhancement of the luminance of the screen.

10 Claims, 18 Drawing Sheets

LIQUID CRYSTAL DISPLAY DEVICE

CLAIM OF PRIORITY

The present application claims priority from Japanese patent application JP 2011-095969 filed on Apr. 22, 2011, the content of which is hereby incorporated by reference into this application.

FIELD OF THE INVENTION

The present invention relates to a liquid crystal display device, and particularly relates to a liquid crystal display device where luminance is enhanced by providing an orientation control function to an alignment film by the irradiation of light and enhancing transmissivity in a pixel.

BACKGROUND OF THE INVENTION

In a liquid crystal display device, a thin film transistor (TFT) substrate on which a pixel electrode and a thin film transistor (TFT) and others are formed in a matrix and a counter substrate on which a color filter and others are formed in a location corresponding to the pixel electrode of the TFT substrate opposite to the TFT substrate are installed, and liquid crystal is held between the TFT substrate and the counter substrate. An image is formed by controlling the transmissivity of light in a liquid crystal molecule every pixel.

Since the liquid crystal display device is flat and light, the application of it spreads in various fields such as a large display device including TV, a cellular phone and a digital still camera (DSC). In the meantime, the liquid crystal display device has a problem related to an angle of visibility. A characteristic of an angle of visibility is a phenomenon that luminance varies and chromaticity varies between a case in which a screen is viewed from the front and a case in which the screen is viewed from an oblique direction. In plane switching (IPS) that operates a liquid crystal molecule by a horizontal electric field has an excellent characteristic of an angle of visibility.

Although the IPS has various methods, they are the mainstream because a pixel electrode having a slit or a counter electrode is formed on a counter electrode formed flatly and solidly or a pixel electrode via an interlayer insulation film and the method of turning a liquid crystal molecule by a line of electric force passing the slit can enhance transmissivity. A pixel structure is disclosed in JP-A No. 2010-8999 in which the occurrence of a domain is inhibited and transmissivity is enhanced in IPS having such configuration.

In configurations in JP-A No. 2010-8999 and in JP-A No. 2009-47839, transmissivity in a circumference of a pixel is enhanced by specifying mutual contours of a pixel electrode and a counter electrode. In the meantime, the pixel electrode is required to be connected to a source electrode of TFT via a contact hole. An organic passivation film is formed to flatten a surface on the TFT. To make contact between the source electrode and the pixel electrode, the contact hole is required to be formed in the organic passivation film. To prevent the disconnection of the pixel electrode, it is desirable that the cone angle of the contact hole is 45 degrees or less. Then, an upper hole of the contact hole has a large area.

An alignment film is formed on the pixel electrode to initially orient a liquid crystal molecule. Heretofore, a rubbing process has been performed to provide an orientation characteristic to the alignment film. However, since the contact hole is concave, a satisfactory rubbing orientation process cannot be applied to the alignment film in this part and orientation control cannot be applied to liquid crystal. Accordingly, in the part of the contact hole, the leakage of light by the disarray in orientation of liquid crystal is caused and image quality such as contrast ratio is deteriorated. To prevent this, a shading film has been heretofore formed to cover a contact hole area. However, the shading film naturally deteriorates a numerical aperture of a pixel and accordingly, deteriorates transmissivity and the luminance of a screen.

SUMMARY OF THE INVENTION

An object of the present invention is to possibly reduce the area of a shading film in a contact hole, to enhance the transmissivity of a pixel and to realize a liquid crystal display device with high luminance of a screen.

The present invention surmounts the above-mentioned problem and concrete steps are as follows. That is, orientation control is applied to an alignment film depending upon optical orientation and the alignment film on an inner wall in a contact hole can also control a liquid crystal molecule. That is, according to optical orientation, an orientation control function can also be provided to the alignment film formed in the contact hole without causing the disarray of orientation. Hereby, as the large area of a source electrode and the shading of the whole contact hole are not required, transmissivity can be enhanced.

This method can be applied both to IPS having configuration that a counter electrode is formed on the downside and a pixel electrode having a slit is formed on the upside via an interlayer insulation film and to IPS having configuration that a pixel electrode is formed on the downside and a counter electrode having a slit is formed on the upside via an interlayer insulation film.

Further, the present invention that makes the inside of the contact hole a transmissible area for forming a pixel can also be applied to a liquid crystal display device according to a vertical alignment (VA) method which is a special method in addition to IPS.

According to the present invention, since a predetermined orientation characteristic can also be provided to the alignment film on the inner wall of the contact hole and the inner wall of the contact hole can be used for an image formation area the liquid crystal display device having great transmissivity and great luminance can be realized.

DETAILED DESCRIPTION OF THE PREFERRED EMBODIMENTS

Embodiments disclosing the contents of the present invention will be described below, comparing them with examples according to the related art.

First Embodiment

Figure 1:
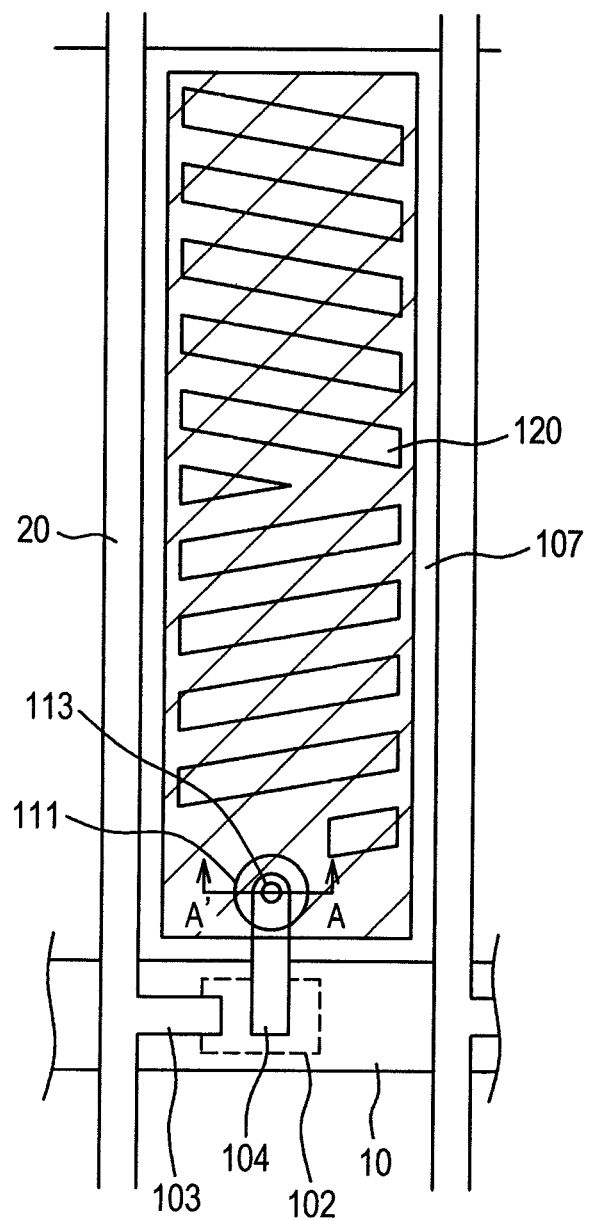
FIG. 1 is a plan showing a pixel part in a first embodiment.
Figure 2:
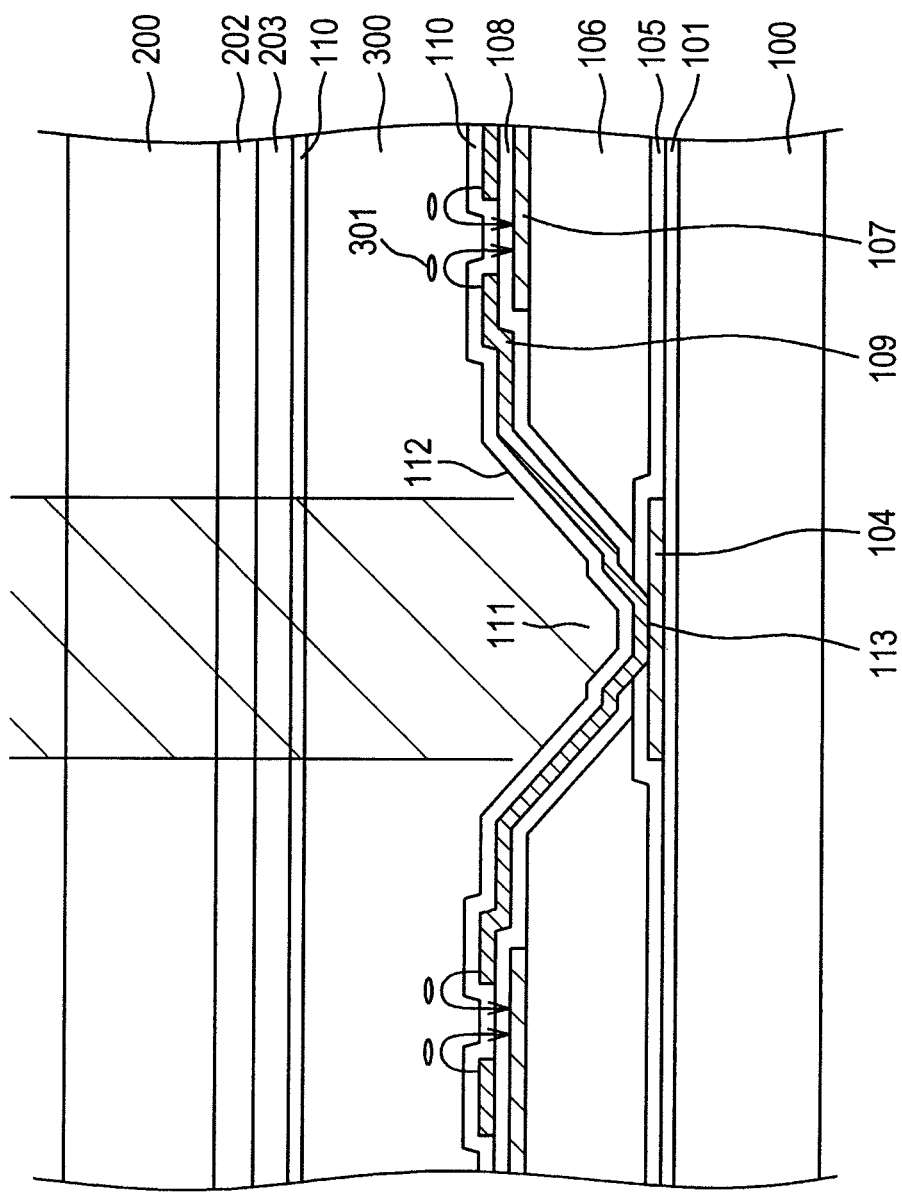
FIG. 2 is a sectional view viewed along a line A-A' in FIG. 1.
Figure 3:
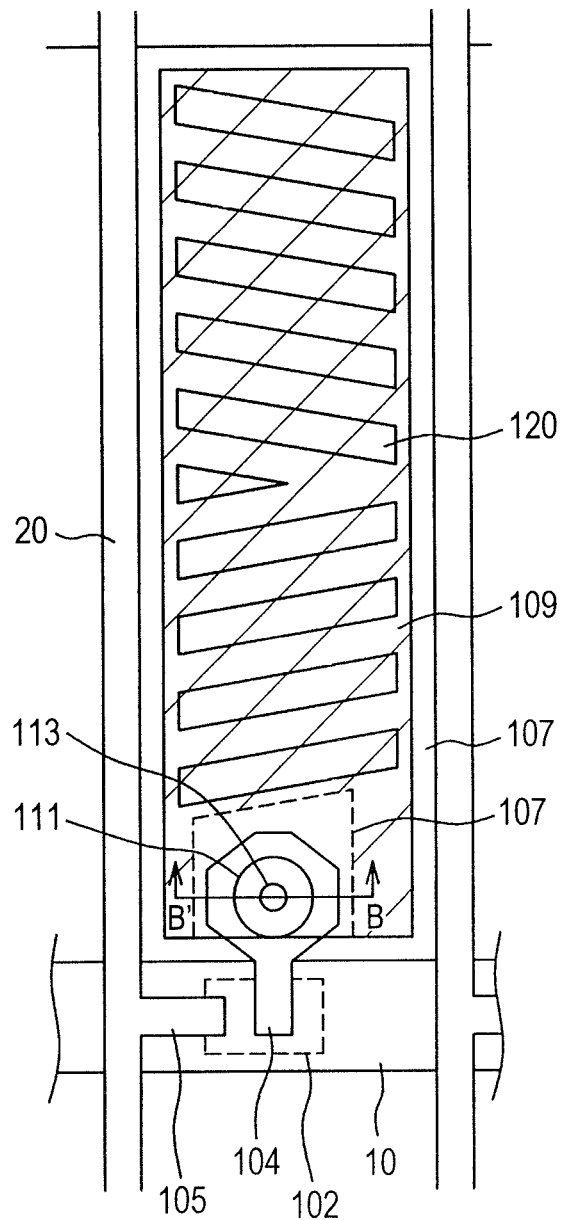
FIG. 3 is a plan showing a pixel part in the related art.
Figure 4:
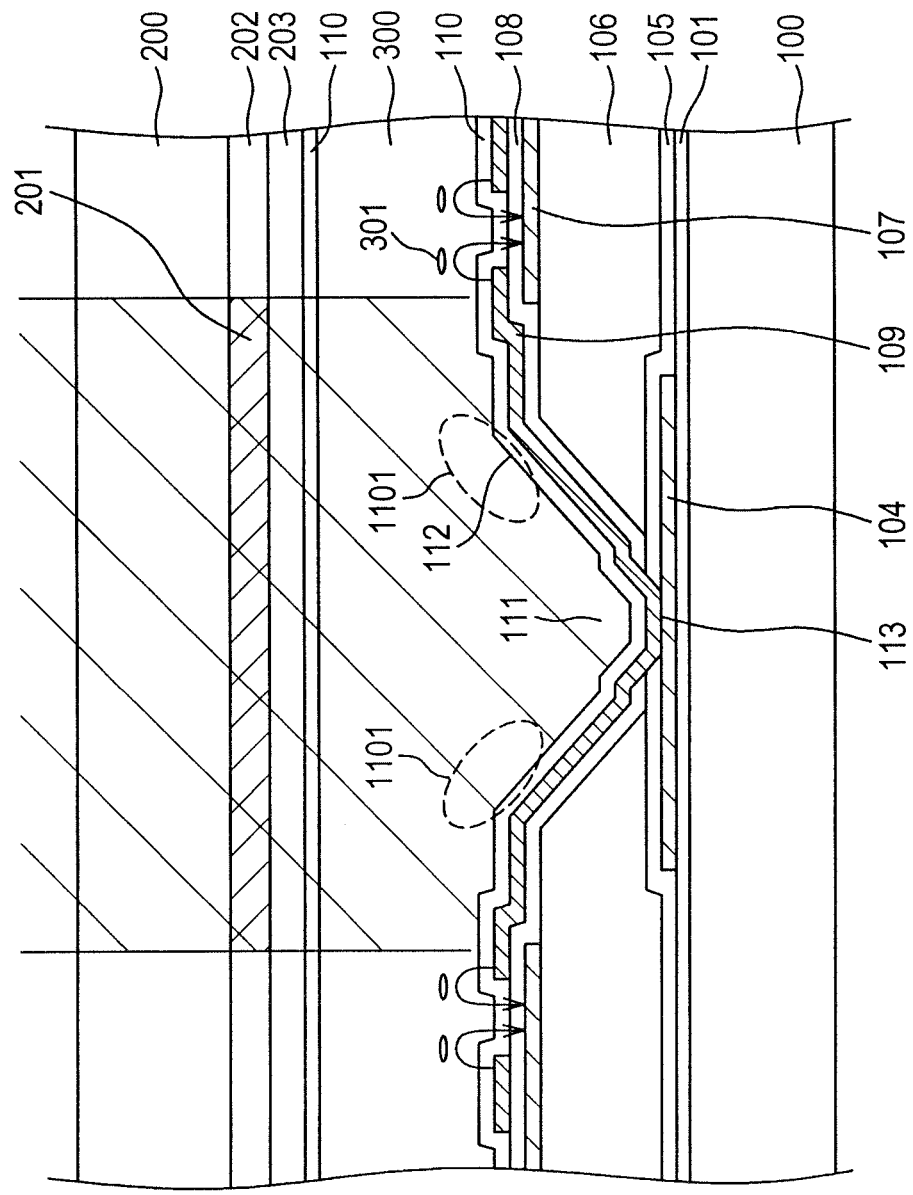
FIG. 4 is a sectional view viewed along a line B-B' in FIG. 3.

A first embodiment relates to IPS having configuration that a flat solid counter electrode 107 is arranged on the downside and a pixel electrode 109 having a slit 120 is arranged on the upside via an interlayer insulation film 108. FIG. 1 shows the planar configuration of pixels in this embodiment and FIG. 2 is a sectional view viewed along a line A-A' in FIG. 1. In FIGS. 1 and 2, an alignment film 110 controls orientation depending upon optical orientation. FIG. 3 is a plan showing pixels in the related art having the same electrode configuration and FIG. 4 is a sectional view viewed along a line B-B' in FIG. 3. In the related art shown in FIGS. 3 and 4, an alignment film 110 controls orientation depending upon rubbing.

To explain characteristics of the present invention, FIGS. 3 and 4 showing a configuration in the related art will be first described. In FIG. 3, a pixel area is formed in an area enclosed by a picture signal conductor 20 vertically extended and a scanning line 10 horizontally extended. TFT that controls the supply of a picture signal to a pixel electrode 109 is formed on the scanning line 10. In FIG. 3, the scanning line 10 also functions as a gate electrode of the TFT, and a semiconductor layer 102 made of a-Si is formed on the scanning line 10. A drain electrode 103 branched from the picture signal conductor 20 is formed on the semiconductor layer 102, and a source electrode 104 is formed opposite to the drain electrode 103. The source electrode 104 is extended to the pixel area and is connected to the pixel electrode 109 in a contact hole 111.

As shown in FIG. 3, the source electrode 104 is formed in an octagon in the contact hole 111 in the pixel area so as to function as a shadowing film and accounts for large area. The contact hole 111 is covered by the octagonal source electrode 104 from the downside to prevent light from a back light from irradiating the contact hole 111.

In FIG. 3, in the pixel area, a counter electrode 107 is formed flatly and solidly on the downside and the pixel electrode 109 having a slit 120 is arranged on the upside via an interlayer insulation film not shown in FIG. 3. The pixel electrode 109 is connected to the source electrode 104 in a contact portion 113 of the contact hole 111. As shown in FIG. 3, the counter electrode 107 is not formed in an area a size larger than the source electrode 104 and shown by a dotted line. That is, liquid crystal is not controlled in the trapezoidal area enclosed by the dotted line.

Accordingly, in this part, light from the back light is screened by a black matrix 201 on a counter substrate 200 not shown in FIG. 3. That is, in the configuration shown in FIG. 3, since the trapezoidal part shown by the dotted line does not contributes to image formation, a numerical aperture is reduced, and transmissivity and luminance are reduced. In FIG. 3, an area that contributes to image formation is shown by oblique lines.

FIG. 4 is the sectional view viewed along the line B-B' in FIG. 3. As shown in FIG. 4, a gate insulating film 101 used by TFT not shown is formed on a TFT substrate 100 and the source electrode 104 extended from the TFT is formed on the gate insulating film. The source electrode 104 in this part is wider as shown in FIG. 3 and screens light from the back light. An inorganic passivation film 105 is formed with the passivation film covering the source electrode 104, and an organic passivation film 106 that also functions as a flattening film is formed on the inorganic passivation film.

The contact hole 111 for the pixel electrode 109 to make contact with the source electrode 104 is formed in the organic passivation film 106. The contact hole 111 formed in the organic passivation film 106 is configured by a lower hole for making the pixel electrode 109 and the source electrode 104 contact, an upper hole having a larger diameter than the lower hole and an inner wall 112 that fastens the lower hole and the upper hole. To prevent disconnection in a stepped part of the pixel electrode 109, the taper of the inner wall 112 cannot have a great inclination and for example, the inclination is 45 degrees or less. Accordingly, since the organic passivation film 106 is approximately 2 µm, which is thick, a diameter of the upper hole of the contact hole 111 formed in the organic passivation film 106 is very large.

The counter electrode 107 is formed flatly and solidly on the organic passivation film 106. The counter electrode 107 is formed in an area except the contact hole 111. The counter electrode 107 is formed in not only one pixel but in other pixels in common and common voltage is applied to the counter electrode 107. An interlayer insulation film 108 is formed on the counter electrode 107 and the pixel electrode 109 having the slit 120 is formed on the interlayer insulation film 108. The contact hole 111 is formed in the inorganic passivation film 105 and the interlayer insulation film 108, and the pixel electrode 109 and the source electrode 104 conduct in the contact portion 113 of the contact hole 111. An alignment film 110 is formed over the pixel electrode 109. The pixel electrode 109 and the counter electrode 107 are made of indium tin oxide (ITO) to be a transparent conductive film.

As shown in FIG. 4, the counter substrate 200 is arranged on the other side of a liquid crystal layer 300. The black matrix 201 and a color filter 202 are formed on the counter substrate 200, an overcoat 203 is formed with the overcoat covering these, and an alignment film 110 is formed on the overcoat. In FIG. 4, an orientation process is applied to each alignment film 110 by rubbing both on the side of the TFT substrate 100 and on the side of the counter substrate 200.

When a picture signal is applied to the pixel electrode 109 on the side of the TFT substrate 100 shown in FIG. 4, lines of electric force are generated via the slit 120 formed in the pixel electrode 109, a liquid crystal molecule 301 is turned, and the transmission of light from the back light is controlled. That is, although the liquid crystal molecule 301 is initially oriented by the alignment film 110, the transmission of light is controlled by being turned from a position of initial orientation by means of a horizontal electric field.

Although the alignment film 110 can control orientation by rubbing when the surface is flat, since a part of the contact hole 111 shown in FIG. 4 is concave, orientation cannot be controlled by rubbing in this part. Light from the back light leaks and contrast is deteriorated in a part 1101 in which no orientation control is made, therefore shading is required. In FIG. 4, the shading is made by the source electrode 104.

As shown in FIG. 4, the counter electrode 107 is formed in a location except the contact hole 111. That is, it is in only a part where the counter electrode 107 is formed that the liquid crystal molecule 301 can be controlled by a picture signal. As the disarray of orientation by rubbing 1101 is caused not only inside the contact hole 111 but in a circumference of the contact hole 111, this part is required to be excluded from a transmissible area of a pixel. Accordingly, this part is shaded by the black matrix 201 formed on the counter substrate 200. That is, a range in which no counter electrode 107 is formed is hatched by oblique lines as shown in FIG. 4, and the range is substantially matched with the area of the black matrix 201 formed on the counter substrate 200. To enhance the luminance of a screen, the hatched range shown in FIG. 4 is required to be reduced. However, there is a limit in a case that a rubbing process is applied to the alignment film 110 as in the related art.

FIG. 1 is a plan showing a pixel in the first embodiment of the present invention. FIG. 1 is different from FIG. 3 showing the related art in that the area of a source electrode 104 is not expanded in a pixel area. That is, in FIG. 1, the area on which the source electrode 104 acts as a shading film is considerably small, compared with the area in FIG. 3. In FIG. 1, an area that contributes to image formation is shown by oblique lines. The hatched area is larger, compared with that in the case of FIG. 3. In the configuration shown in FIG. 1, a numerical aperture is enhanced by the quantity, and as a result, transmissivity and luminance can be enhanced. That is, since orientation control over the alignment film 110 depends upon optical orientation in FIG. 1, a liquid crystal molecule 301 can also be oriented inside a contact hole 111 and an inclined plane of an inner wall 112 of the contact hole 111 can also be used for a transmissible area for image formation. Since the other configuration in FIG. 1 is the same as that in FIG. 3, the description is omitted.

FIG. 2 is the sectional view viewed along the line A-A' in FIG. 1. FIG. 2 is significantly different from FIG. 4 showing the related art in that the width of the source electrode 104 that also functions as a shading film is very small. Accordingly, a shaded range shown in FIG. 2 is very small, compared with that in FIG. 4, the transmissivity of a pixel is enhanced by the quantity, and luminance can be enhanced.

The reason why the area of the shading film by the source electrode 104 can be reduced by the quantity as shown in FIG. 2 is that optical orientation is used for orientation by the alignment film 110 in this embodiment. In the optical orientation, orientation control over the alignment film 110 is made by radiating polarized ultraviolet rays. In the optical orientation, orientation control can also be applied to the alignment film 110 in a concave portion such as the contact hole 111 differently from the orientation by rubbing.

That is, as satisfactory orientation control can also be applied to the alignment film 110 on the inclined plane of the inner wall 112 of the contact hole 111 shown in FIG. 2, the liquid crystal molecule 301 is also controlled inside the contact hole 111 and can contribute to image formation. Accordingly, as a role as a shading film of the source electrode 104 is not required in the configuration shown in FIG. 2, the source electrode has only to have minimum area for electric contact. That is, transmissivity in a pixel can be enhanced by the quantity.

In FIG. 2, the counter electrode 107 is formed only up to a circumference of the contact hole 111 as in FIG. 4. However, since a liquid crystal molecule 301 in a part where no counter electrode 107 is formed can also be turned by means of the elastic effect of liquid crystal when orientation control is applied to the alignment film 110, the counter electrode can contribute to image formation. Further, as shown in FIG. 2, a black matrix 201 is not necessarily required to be formed on a counter substrate 200.

As described above, in this embodiment, since the area of shading by the source electrode 104 can be significantly small, compared with an example in the related art, the transmissivity of a pixel can be enhanced and the luminance of a screen can be enhanced.

Second Embodiment

Figure 5:
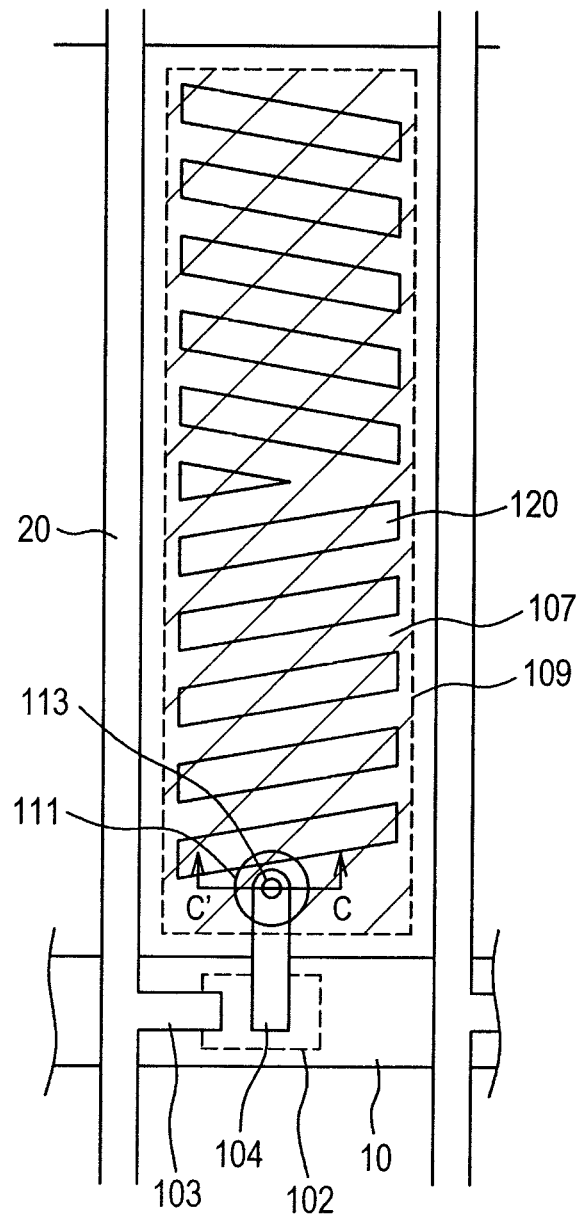
FIG. 5 is a plan showing a pixel part in a second embodiment.
Figure 6:
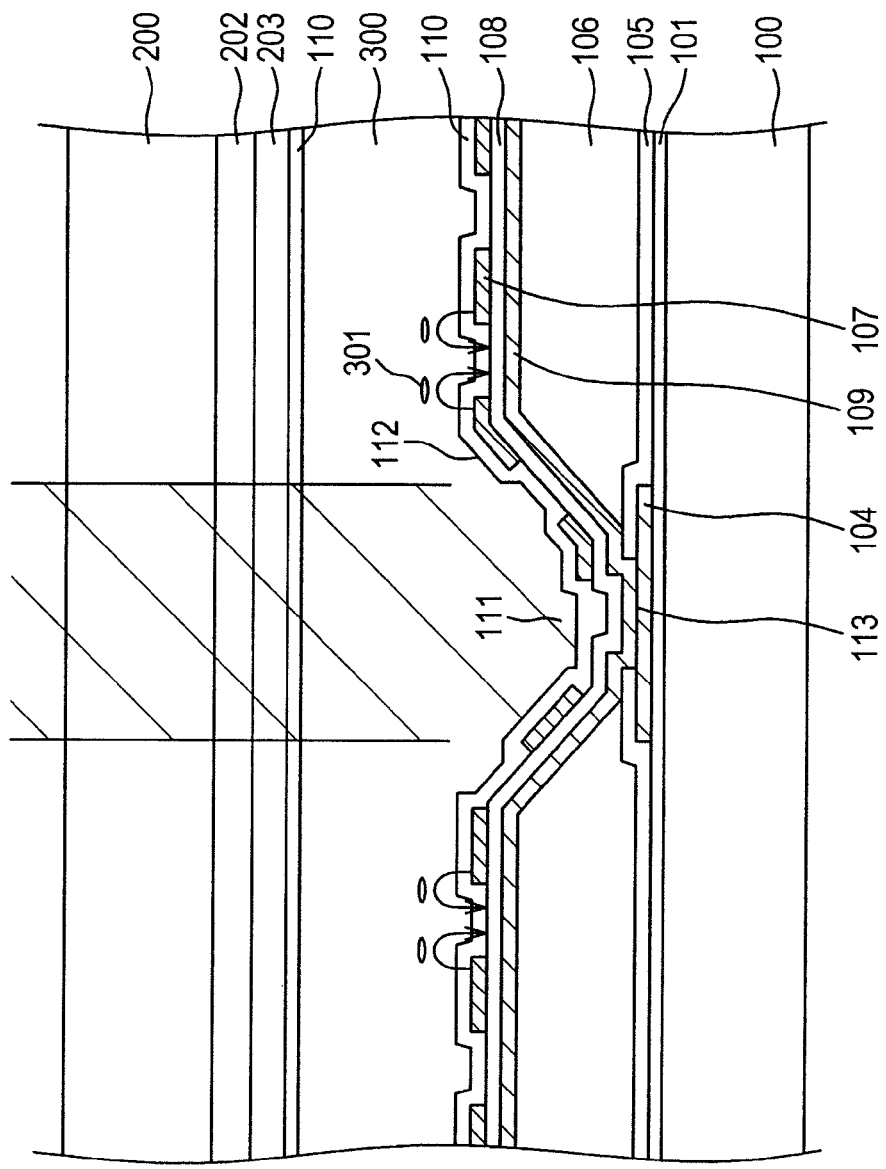
FIG. 6 is a sectional view viewed along a line C-C' in FIG. 5.
Figure 7:
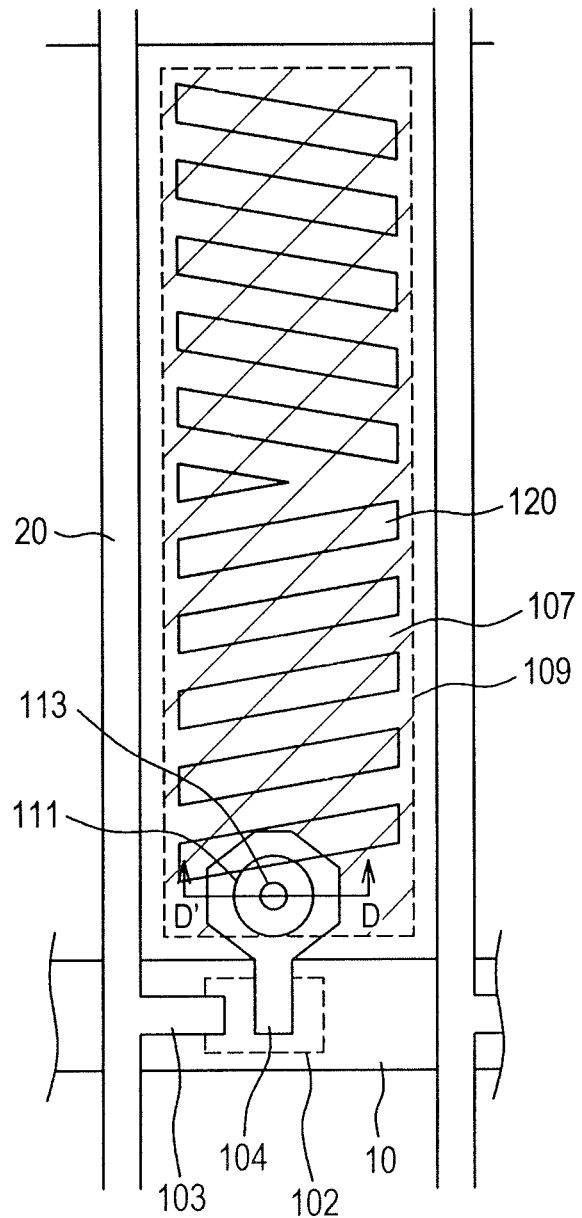
FIG. 7 is a plan showing a pixel part in the related art.
Figure 8:
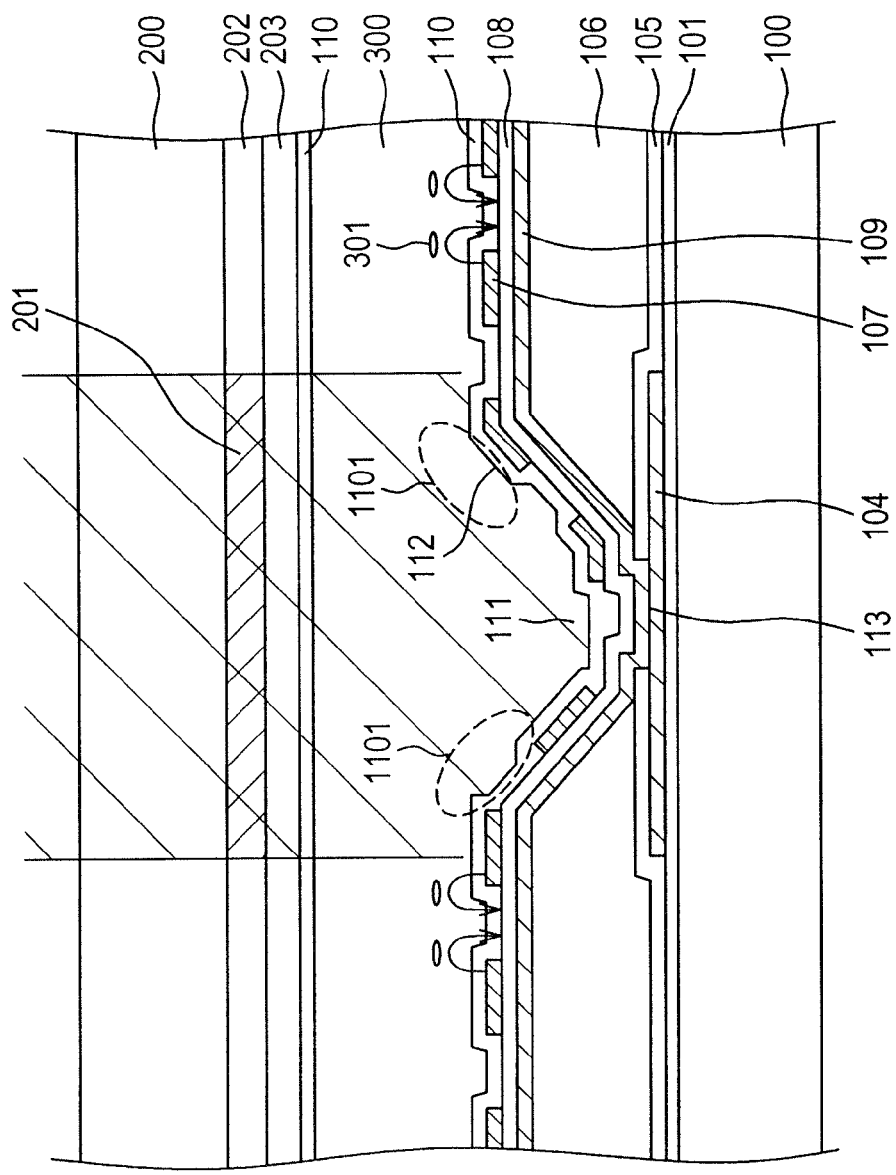
FIG. 8 is a sectional view viewed along a line D-D' in FIG. 7.

In a second embodiment, the present invention is applied to IPS having configuration that a flat and solid pixel electrode 109 is arranged on the downside and a counter electrode 107 having a slit 120 is arranged on the upside via an interlayer insulation film 108 reversely to the first embodiment. FIG. 5 shows a planar configuration of a pixel in this embodiment and FIG. 6 is a sectional view viewed along a line C-C' in FIG. 5. In FIGS. 5 and 6 showing this embodiment, an alignment film 110 also controls orientation depending upon optical orientation. FIG. 7 is a plan showing a pixel in the related art having the same electrode configuration and FIG. 8 is a sectional view viewed along a line D-D' in FIG. 7. In the related art shown in FIGS. 7 and 8, an alignment film 110 controls orientation depending upon rubbing.

To explain the characteristics of the present invention, FIGS. 7 and 8 showing configuration in the related art will be first described. FIG. 7 is similar to FIG. 3 except the configuration of electrodes enclosed by a picture signal conductor 20 and a scanning line 10. FIG. 7 is different from FIG. 3 in that a pixel electrode 109 shown by a dotted line is formed flatly and solidly and a counter electrode 107 having a slit 120 is formed over the pixel electrode via an interlayer insulation film not shown in FIG. 7.

As shown in FIG. 7, the pixel electrode 109 shown by the dotted line covers a source electrode 104 extended from TFT in a pixel area. The counter electrode 107 having the slit 120 is formed not only in one pixel but in other pixels in common and common voltage is applied to the counter electrode. The slit 120 formed in the counter electrode 107 is also overlapped with the source electrode 104 and a contact hole 111.

In the configuration shown in FIG. 7, light from a back light is screened by the octagonal source electrode 104 in the contact hole ill. Since orientation control over the alignment film 110 is also made by rubbing in FIG. 7, the source electrode 104 is formed to be larger than the contact hole 111 in the vicinity of the contact hole 111 so as to prevent the leakage of light by the disarray of orientation 1101. An area that contributes to image formation in FIG. 7 is shown by oblique lines.

FIG. 8 is the sectional view viewed along the line D-D' in FIG. 7. As FIG. 8 is similar to FIG. 4 till the formation of an organic passivation film 106, the description is omitted. As shown in FIG. 8, after the organic passivation film 106 is formed, the contact hole 111 is formed. Afterward, the contact hole 111 is formed in an inorganic passivation film 105 in the contact hole 111 in the organic passivation film 106. In FIG. 8, the contact holes in the organic passivation film 106 and in the inorganic passivation film 105 are formed using separate masks. However, after the contact hole 111 is formed in the organic passivation film 106, the contact hole in the inorganic passivation film 105 can also be formed using the organic passivation film 106 for resist.

Afterward, the pixel electrode 109 is coated with the pixel electrode covering the organic passivation film 106 and the contact hole 111. The pixel electrode 109 and the counter electrode 107 are made of indium tin oxide (ITO). The pixel electrode 109 in this embodiment is formed flatly and solidly. The pixel electrode 109 makes contact with the source electrode 104 in a contact portion 113 of the contact hole 111.

Afterward, the interlayer insulation film 108 is formed and the counter electrode 107 having a slit 120 is formed on the interlayer insulation film. The counter electrode 107 and the slit 120 are also formed in the contact hole 111. The alignment film 110 for orienting liquid crystal is formed on the counter electrode 107. Orientation control is applied to the alignment film 110 by rubbing and since the disarray of orientation 1101 is caused in the contact hole 111 and its circumference, the source electrode 104 is formed in larger area than the upper hole of the contact hole to prevent light from leaking from this part. That is, in FIG. 8, an area shown by oblique lines in which light from the back light is screened is defined by the source electrode 104.

In FIG. 8, the configuration of a counter substrate 200 is similar to that shown in FIG. 4. However, since an area of a black matrix 201 in FIG. 8 substantially coincides with a shaded area defined by the source electrode 104, the area is small, compared with that in a case shown in FIG. 4. Even so, since the area of the source electrode 104 is large, an area for forming a pixel where light is transmitted is limited by the quantity.

FIG. 5 is a plan showing the pixel in this embodiment. FIG. 5 is different from FIG. 7 showing the related art in that the area of a source electrode 104 is not expanded in a pixel area. That is, in FIG. 5, the area on which the source electrode 104 acts as a shading film is considerably small, compared with the area shown in FIG. 7.

In FIG. 5, an area that contributes to image formation is shown by oblique lines. The area shown by the oblique lines increases, compared with a case shown in FIG. 7. In configuration shown in FIG. 5, the transmissivity and the luminance of a screen can be enhanced corresponding to this increase. The reason is that since orientation control over the alignment film 110 depends upon optical orientation in FIG. 5, a liquid crystal molecule 301 can be oriented inside a contact hole 111 and an inclined plane of an inner wall 112 of the contact hole 111 can also be used for a transmissible area for image formation. Since the rest of the configuration in FIG. 5 is the same as that in FIG. 7, the description is omitted.

FIG. 6 is the sectional view viewed along the line C-C' in FIG. 5. FIG. 6 is significantly different from FIG. 8 showing the related art in that the width of the source electrode 104 that also functions as the shading film is very narrow. Accordingly, a shaded range shown by oblique lines in FIG. 6 is very small, compared with that shown in FIG. 8, the transmissivity of the pixel is enhanced by the quantity, and luminance can be enhanced.

The reason why the area of the shading film by the source electrode 104 can be reduced as described above as shown in FIG. 6 is that optical orientation is used in FIG. 6. That is, in FIG. 6, since orientation control can also be applied to the alignment film 110 on the inclined plane of the inner wall 112 of the contact hole 111, the liquid crystal molecule 301 is also controlled inside the contact hole 111 and can contribute to image formation.

As shown in FIG. 6, since the slit 120 of the counter electrode 107 is also formed in the inner wall 112 of the contact hole 111 and is opposite to the pixel electrode 109 via the interlayer insulation film 108, the liquid crystal molecule 301 can also be controlled inside the contact hole 111. Since a role as the shading film of the source electrode 104 is not required in the configuration shown in FIG. 6, the source electrode has only to have minimum area for electric contact. Accordingly, transmissivity in the pixel can be enhanced by the quantity.

A shaded area shown by the oblique lines in FIG. 6 is defined by the source electrode 104 and a black matrix 201 is not necessarily required to be formed in a corresponding part on a counter substrate 200. As described above, in this embodiment, since the inside of the contact hole 111 can also be used for the formation of a pixel as a transmissible area, the luminance of the liquid crystal display device can be enhanced.

Third Embodiment

Figure 9:
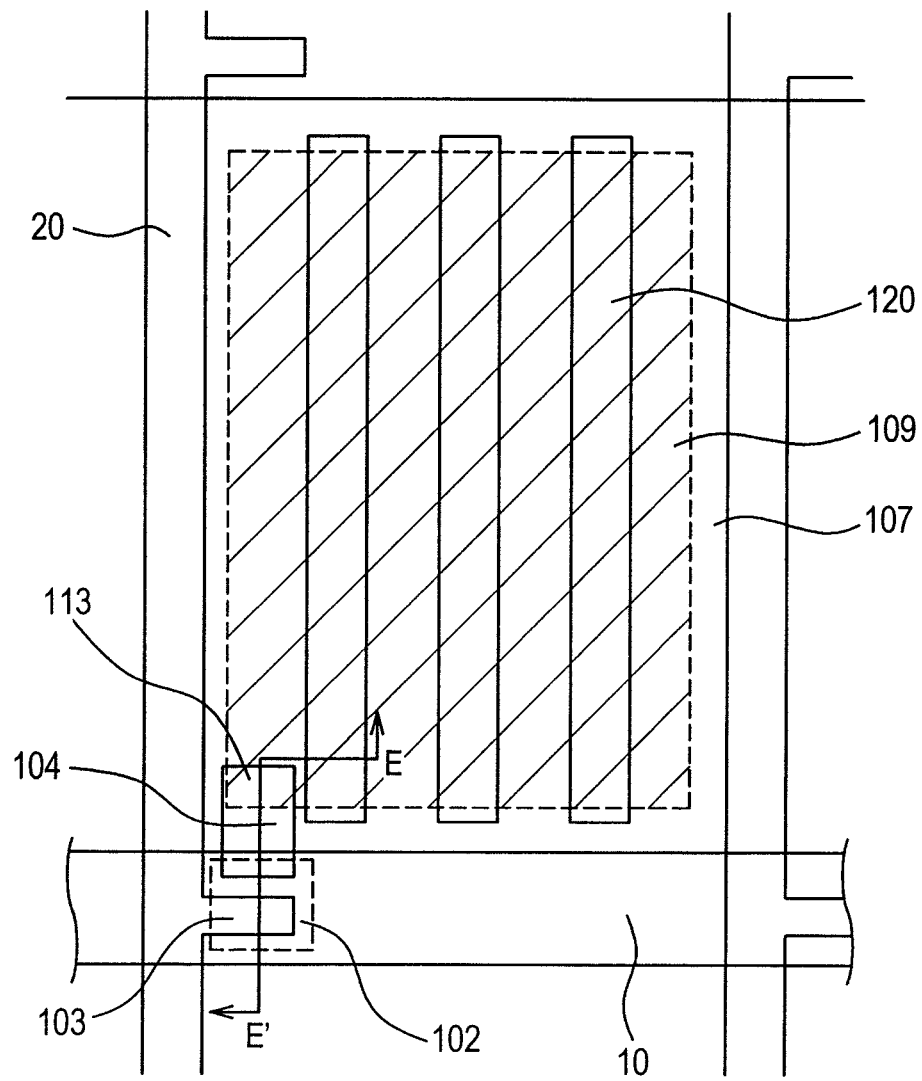
FIG. 9 is a plan showing a pixel part in a third embodiment.
Figure 10:
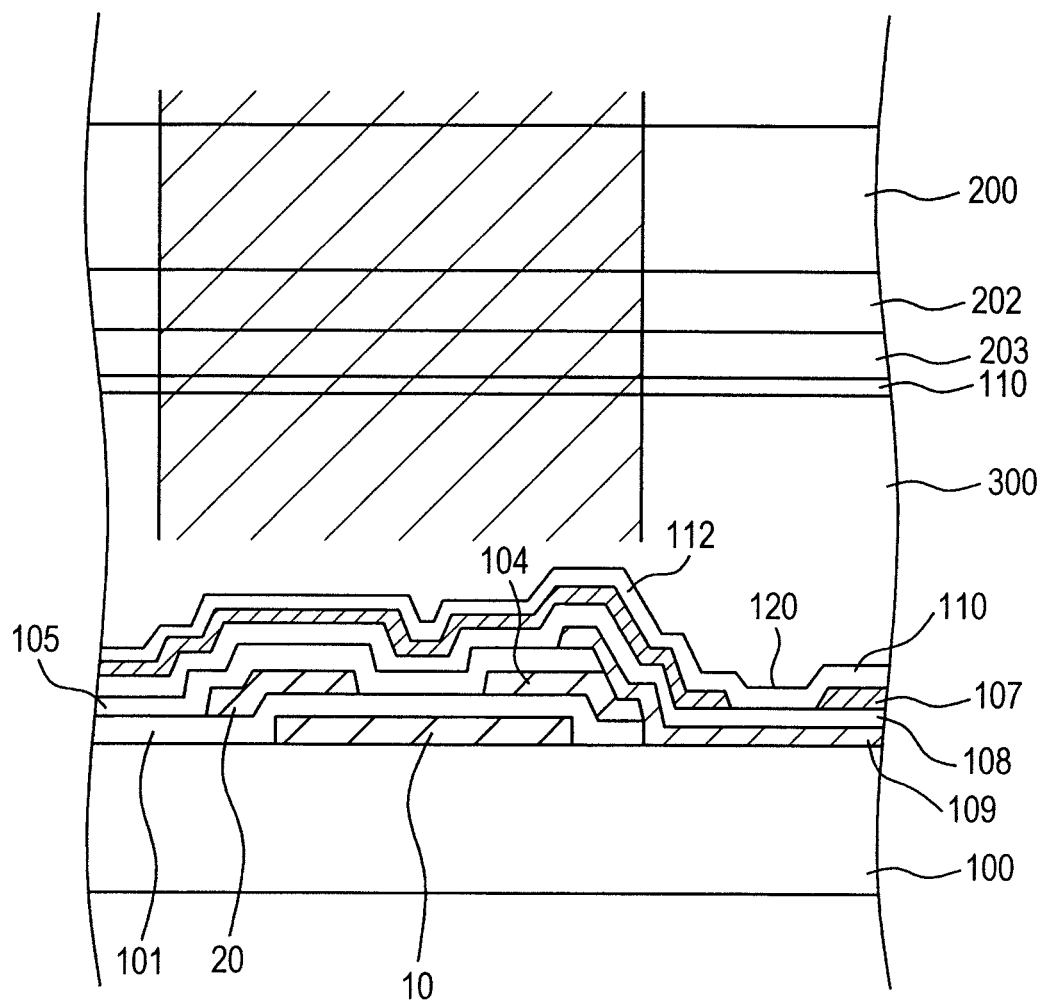
FIG. 10 is a sectional view viewed along a line E-E' in FIG. 9.
Figure 11:
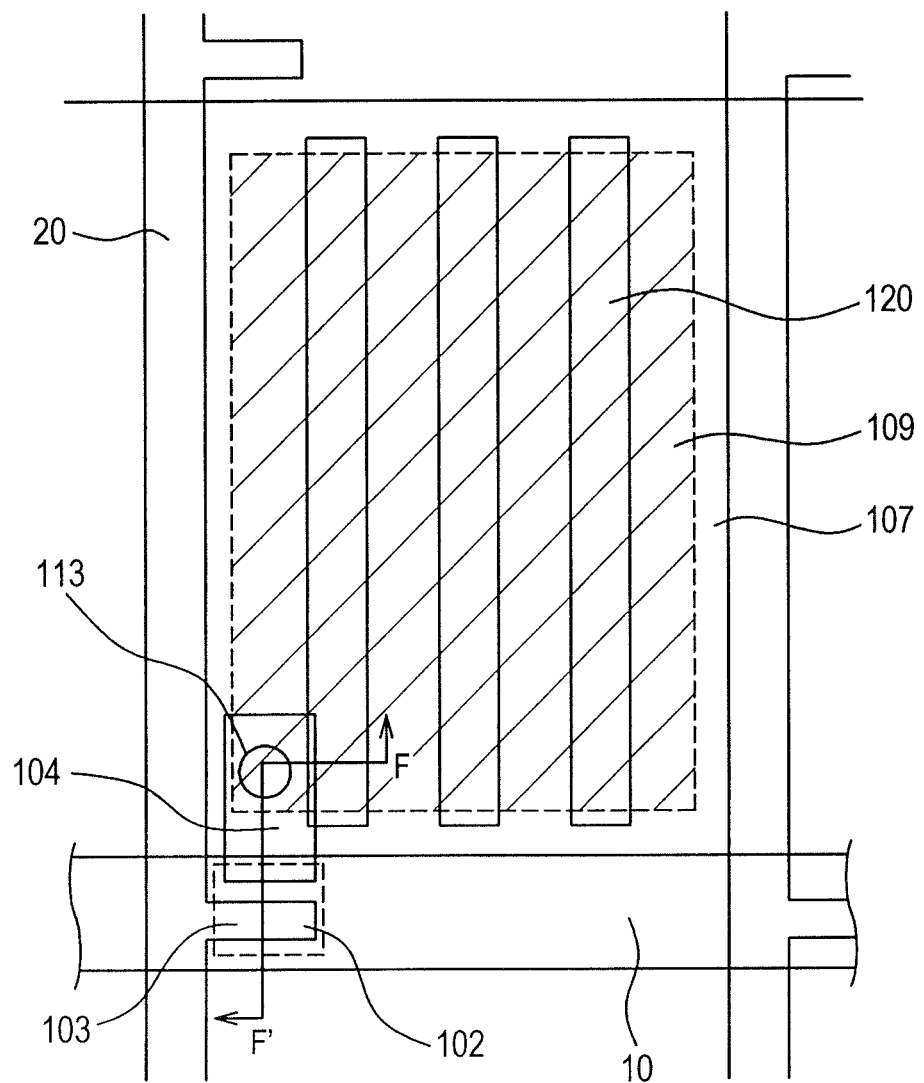
FIG. 11 is a plan showing a pixel part in the related art.
Figure 12:
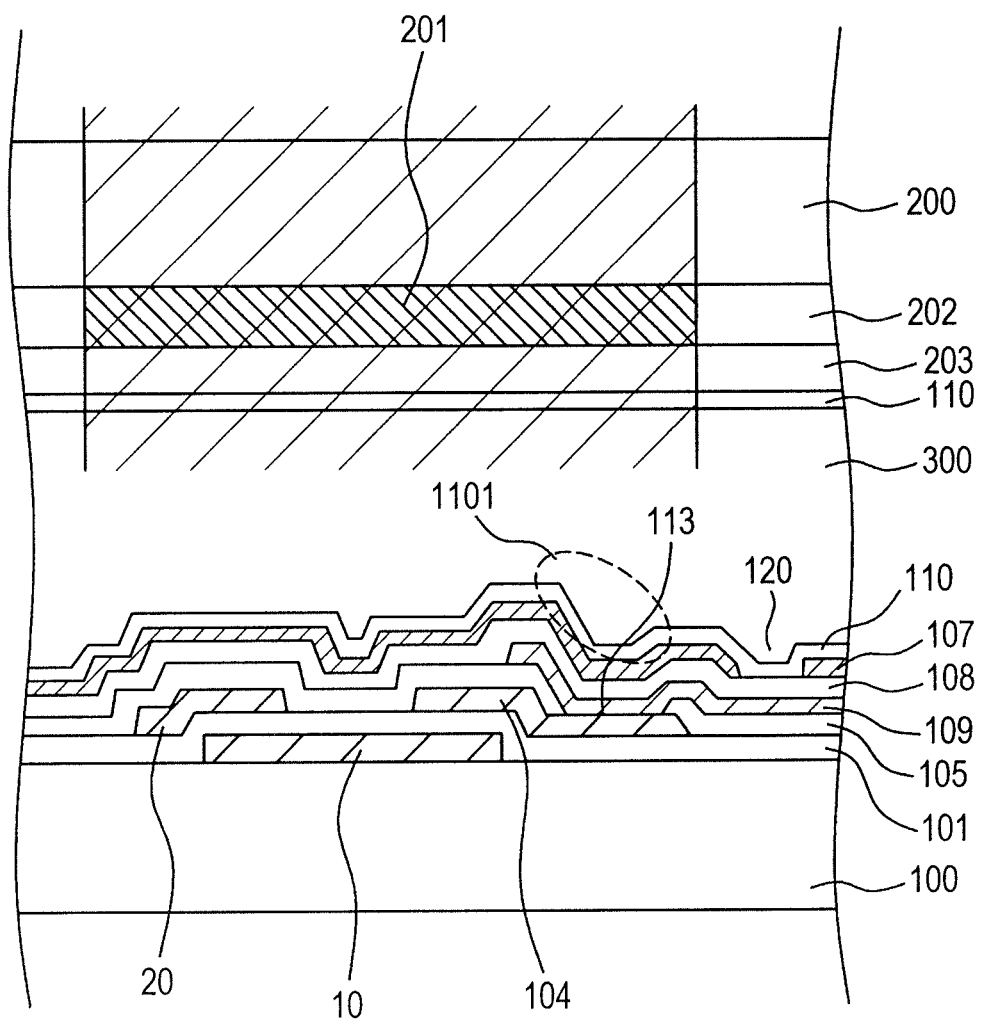
FIG. 12 is a sectional view viewed along a line F-F' in FIG. 11.

In a third embodiment, as in the second embodiment, the present invention is also applied to IPS having a configuration that a flat and solid pixel electrode 109 is arranged on the downside and a counter electrode 107 having a slit 120 is arranged on the upside via an interlayer insulation film 108. FIG. 9 shows the planar configuration of a pixel in this embodiment and FIG. 10 is a sectional view viewed along a line E-E' in FIG. 9. In FIGS. 9 and 10 showing this embodiment, an alignment film 110 also controls orientation depending upon optical orientation. FIG. 11 is a plan showing a pixel in the related art having the similar electrode configuration and FIG. 12 is a sectional view viewed along a line F-F' in FIG. 11. In the related art shown in FIGS. 11 and 12, an alignment film 110 controls orientation depending upon rubbing.

To explain the characteristics of the present invention, FIGS. 11 and 12 showing the related art will be first described. FIG. 11 is significantly different from FIG. 7 in that though it is not shown in FIG. 11, no organic passivation film is formed between a pixel electrode 109 and an inorganic insulating film 105.

In FIG. 11, the pixel electrode 109 shown by a dotted line covers a source electrode 104 extended from TFT in a pixel area. A counter electrode 107 having a slit 120 is formed not only in one pixel but in other pixels in common and common voltage is applied. The slit 120 formed in the counter electrode 107 also covers the source electrode 104 and a contact hole 113.

In the configuration shown in FIG. 11, in the contact hole 113, light from a back light is screened by the square source electrode 104. In FIG. 11, since orientation control over the alignment film 110 is also made by rubbing, the source electrode 104 is formed to be larger than the contact hole 113 so as to prevent the leakage of light by the disarray of orientation 1101 in the vicinity of the contact hole 113. In FIG. 11, an area that contributes to image formation is shown by oblique lines.

FIG. 12 is the sectional view viewed along the line F-F' in FIG. 11. As shown in FIG. 12, after an inorganic passivation film 105 is formed, the contact hole 113 is formed.

Afterward, the pixel electrode 109 is coated with the pixel electrode covering the inorganic passivation film 105 and the contact hole 113. The pixel electrode 109 and the counter electrode 107 are made of indium tin oxide (ITO). The pixel electrode 109 in this embodiment is formed flatly and solidly. The pixel electrode 109 makes contact with the source electrode 104 in the contact hole 113.

Then, an interlayer insulation film 108 is formed and the counter electrode 107 having the slit 120 is formed on the interlayer insulation film. The counter electrode 107 is formed with the counter electrode covering the contact hole 113. The alignment film 110 for orienting liquid crystal is formed on the counter electrode 107. Orientation control is applied to the alignment film 110 by rubbing and since the disarray of orientation 1101 is caused in the contact hole 113 and its vicinity, the source electrode 104 is formed to have a larger area than the upper hole of the contact hole so as to prevent light from leaking from this part. That is, an area shown by oblique lines in FIG. 12 where light from the back light is screened is defined by the source electrode 104.

In FIG. 12, the configuration of a counter substrate 200 is similar to that shown in FIG. 8. Although an area of a black matrix 201 in FIG. 12 substantially coincides with a shaded area defined by the source electrode 104, since the area of the source electrode 104 is large, a light transmissible area for forming a pixel is limited correspondingly.

FIG. 9 is a plan showing a pixel in this embodiment. FIG. 9 is mainly different from FIG. 11 showing the related art in that the area of a source electrode 104 is not expanded in a pixel area. That is, in FIG. 9, the area that acts as a shading film of the source electrode 104 is considerably small, compared with that in FIG. 11.

In FIG. 9, an area that contributes to image formation is shown by oblique lines. The area shown by the oblique lines increases, compared with that in the case of FIG. 1. In configuration shown in FIG. 9, the transmissivity and the luminance of a screen can be enhanced by the quantity. The reason is that since orientation control over the alignment film 110 is made depending upon optical orientation in FIG. 9, a liquid crystal molecule 301 can also be oriented in an upper part of a significantly stepped contact portion 113 and an inclined plane in the vicinity of the source electrode 104 of the contact portion 113 can be used for a transmissible area for image formation. Since the rest of the configuration in FIG. 9 is substantially the same as that in FIG. 11, the description is omitted.

FIG. 10 is the sectional view viewed along the line E-E' in FIG. 9. FIG. 10 is significantly different from FIG. 12 showing the related art in that the size of the source electrode 104 that also functions as the shading film is small. Accordingly, a shaded range shown by oblique lines in FIG. 10 is very small, compared with that in FIG. 12, the transmissivity of a pixel is enhanced by the quantity, and luminance can be enhanced.

The area of the shading film by the source electrode 104 can be reduced as described above as shown in FIG. 10 because optical orientation is used in FIG. 10. That is, as orientation control can also be applied to the alignment film 110 on the stepped inclined plane 112 of the contact portion 113 in FIG. 10, the liquid crystal molecule 301 is also controlled on the stepped inclined plane 112 and can contribute to image formation.

Since a role as the shading film of the source electrode 104 is not required in the configuration shown in FIG. 10, the source electrode has only to have minimum area for electric contact. Accordingly, transmissivity in a pixel can be enhanced by the quantity.

In FIG. 10, a shaded area shown by oblique lines is defined by the source electrode 104 and a black matrix 201 is not necessarily required to be formed in a corresponding part on a counter substrate 200. As described above, in this embodiment, since the inclined plane 112 in the vicinity of the source electrode 104 of the contact portion 113 can be used for forming a pixel as a transmissible area, the luminance of the liquid crystal display device can be enhanced.

Fourth Embodiment

Figure 13:
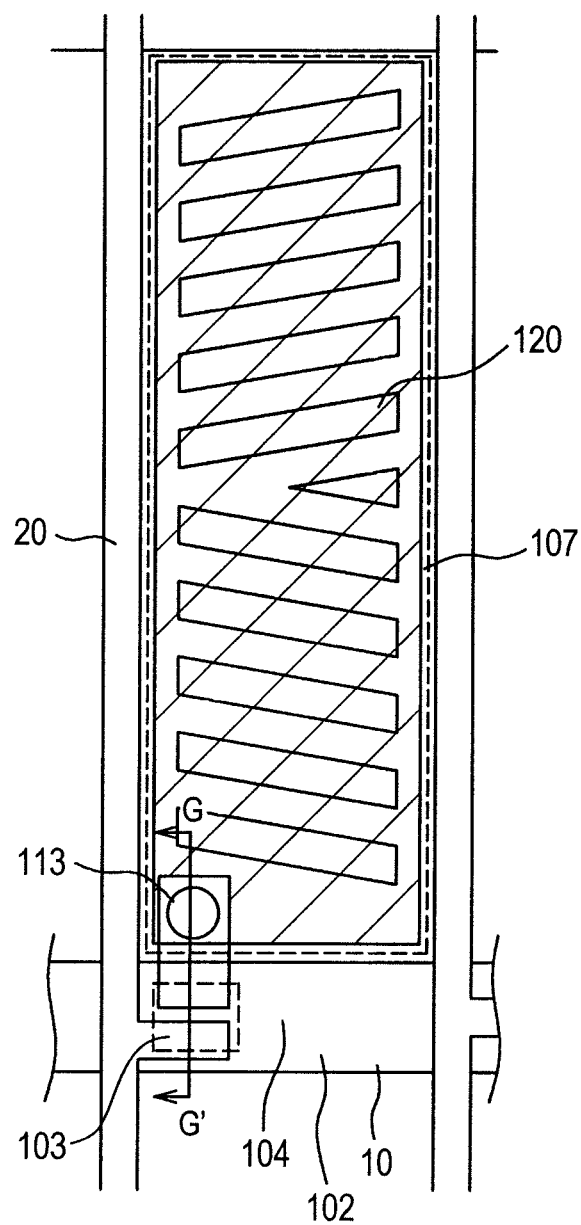
FIG. 13 is a plan showing a pixel part in a fourth embodiment.
Figure 14:
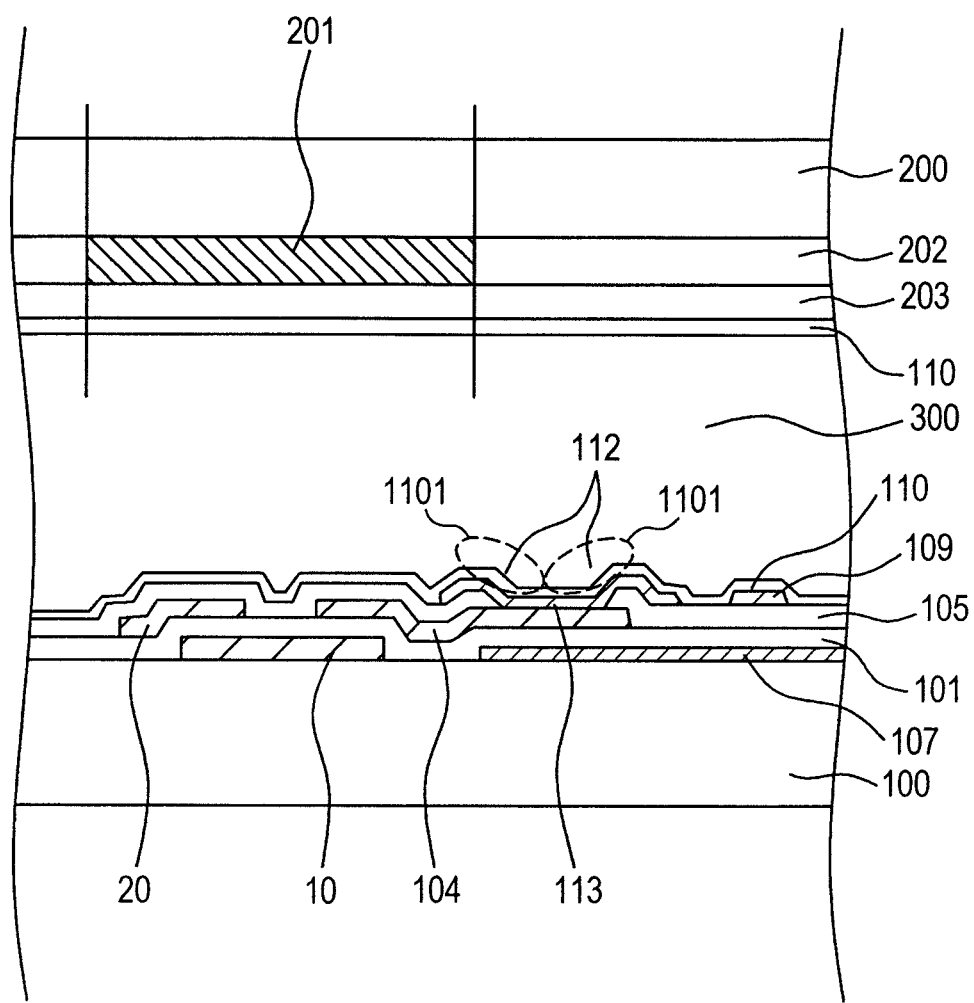
FIG. 14 is a sectional view viewed along a line G-G' in FIG. 13.

A fourth embodiment relates to IPS having a configuration that a flat and solid counter electrode 107 is arranged on the downside and a pixel electrode 109 having a slit 120 is arranged on the upside via a gate insulating film 101 and an inorganic passivation film 105 as in the first embodiment. FIG. 13 shows the planar configuration of a pixel in this embodiment and FIG. 14 is a sectional view viewed along a line G-G' in FIG. 13. In FIGS. 13 and 14, an alignment film 110 controls orientation depending upon optical orientation.

To explain the characteristics of the present invention, FIG. 13 showing the planar configuration of the pixel will be first described. FIG. 13 is mainly different from FIG. 1 in that though it is not shown in FIG. 13, no organic passivation film is formed under the counter electrode 107. As shown in FIG. 13, the counter electrode 107 shown by a dotted line is overlapped with a source electrode 104 extended from TFT in a pixel area. The source electrode 104 is extended to the pixel area and connected to the pixel electrode 109 having the slit 120 via a contact hole portion 113.

In the configuration shown in FIG. 13, light from a back light is screened by the square source electrode 104 in the contact hole portion 113. In FIG. 13, an area that contributes to image formation is shown by oblique lines.

As shown in FIG. 14, in the pixel area, the counter electrode 107 is formed flatly and solidly on the downside and the pixel electrode 109 having the slit 120 is formed on the upside with the gate insulating film 101 on the counter electrode and further, the inorganic passivation film 105 between the counter electrode and the pixel electrode. In the inorganic passivation film 105, a contact hole is formed, and the pixel electrode 109 and the source electrode 104 conduct in the contact hole portion 113. The alignment film 110 is formed over the pixel electrode 109. The pixel electrode 109 and the counter electrode 107 are made of indium tin oxide (ITO) to be a transparent conductive film.

In this embodiment, as in the first embodiment, optical orientation is used for the orientation of the alignment film 110. In the optical orientation, unlike orientation by rubbing, orientation control can also be applied to the alignment film 110 in a stepped area 112 in a concave portion such as the contact hole portion 113.

Accordingly, in the configuration shown in FIG. 14, as satisfactory liquid crystal orientation is also acquired in the vicinity of the source electrode 104, where the pixel electrode contacts with the source electrode, a black matrix 201 that shades an area corresponding to the source electrode is not formed on a counter substrate 200. That is, liquid crystal display is also possible in the vicinity of the source electrode, and transmissivity and luminance in a pixel can be enhanced correspondingly.

Since it is difficult to apply satisfactory orientation control to the stepped part when orientation control is applied to the alignment film 110 by rubbing, the leakage of light due to the disarray of the orientation of liquid crystal is easily caused in the vicinity of the stepped part. In that case, to prevent light from leaking due to the disarray of the orientation of liquid crystal in the vicinity of the stepped part, a black matrix 201 formed on the counter substrate 200 is required to be formed largely to cover the stepped part.

As described above, in this embodiment, since the leakage of light due to the disarray of the orientation of liquid crystal caused due to a difference in a level in the vicinity of the source electrode 104 when a rubbing alignment film is used can be inhibited to be less by using optical orientation, the area corresponding to the source electrode 104 is not required to be shaded with a black matrix 201 on the counter substrate 200 and the area of the black matrix can be reduced. Accordingly, the transmissivity of a pixel can be enhanced and the luminance of a screen can be enhanced.

Fifth Embodiment

The first, second, third and fourth embodiments are examples in which the present invention is applied to the IPS liquid crystal display device. However, a vertical alignment (VA) liquid crystal display device is also similar in that transmissivity in a pixel area is deteriorated due to a contact hole 111 for connecting a pixel electrode 109 and a source electrode 104. In a special mode according to VA, the inside of the contact hole 111 can also be used for a transmissible area for forming a pixel.

Figure 15:
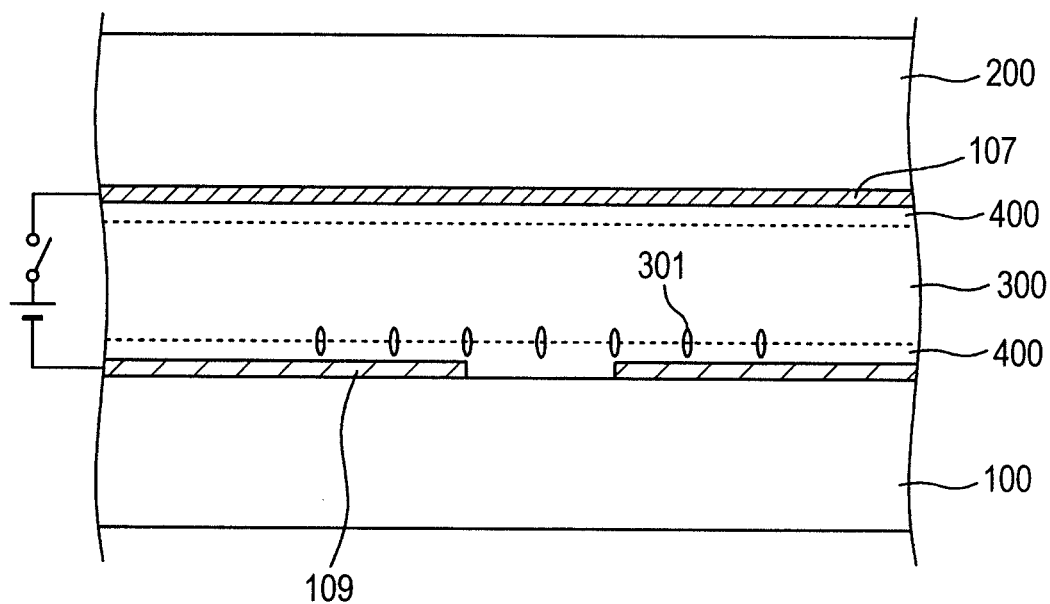
FIG. 15 is a sectional schematic drawing showing a VA liquid crystal display device in a process of a specific method.

FIG. 15 is a sectional schematic drawing showing a VA liquid crystal display device to which the present invention is applied. As shown in FIG. 15, a liquid crystal layer 300 and alignment material 400 are held between a TFT substrate 100 on which a pixel electrode 109 is formed and a counter substrate 200 on which a counter electrode 107 is formed. When a substance acquired by mixing liquid crystal materials and a photoreactive monomer as alignment material for orienting a liquid crystal molecule 301 is sealed between the TFT substrate 100 and the counter substrate 200, the liquid crystal materials and the alignment material are separated, an alignment material layer 400 is formed in the vicinity of the TFT substrate 100 or the counter substrate 200, and the liquid crystal layer 300 is formed between the alignment material layer 400 and the alignment material layer 400.

Or a thin film layer made of alignment film material including a photo-curing side-chain substituent can be formed on the TFT substrate and on a counter CF substrate beforehand in place of sealing the substance acquired by mixing the liquid crystal materials having the negative anisotropy of the dielectric constant and the photoreactive monomer in a cell. Thereby, the initial orientation of liquid crystal by the application of an electric field and the radiation of light as described above can be controlled.

Slit space is formed in the pixel electrode 109 on the TFT substrate 100. The space is formed so as to apply a predetermined electric field for initializing the orientation of liquid crystal by the alignment material layer 400 later. As shown in FIG. 15, when no voltage is generated between the pixel electrode 109 and the counter substrate 200, the liquid crystal molecule 301 is vertically oriented.

Figure 16:
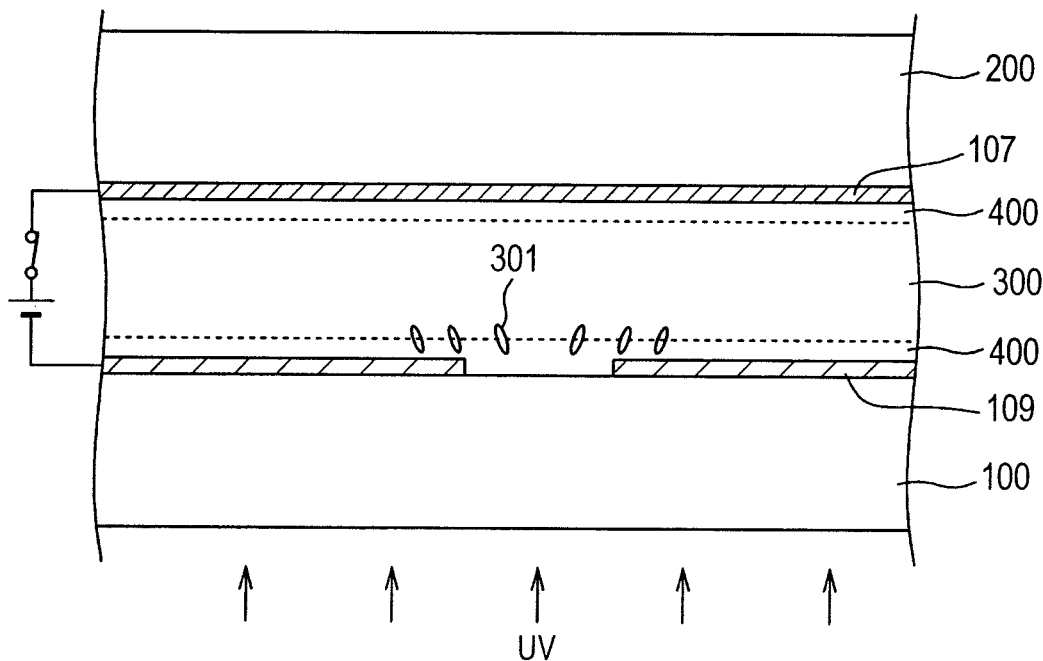
FIG. 16 is a sectional schematic drawing showing the VA liquid crystal display device in the process shown in FIG. 15 of the specific method.

FIG. 16 shows a case that voltage is applied between the pixel electrode 109 and the counter electrode 107, regarding the state shown in FIG. 15. Disturbance is caused in an electric field by means of the effect of the slit space formed in the pixel electrode 109, and the liquid crystal molecule 301 having the negative anisotropy of the dielectric constant is oriented as shown in FIG. 16 according to the distribution of the electric field. In this state, ultraviolet rays are radiated from the side of the TFT substrate 100. Since the used alignment material has a property that it is solidified by ultraviolet rays, the liquid crystal molecules 301 in the vicinity of the TFT substrate 100 are fixed in a state in which they are oriented as shown in FIG. 16. Hereby, initial orientation of a predetermined pretilt angle of approximately 88 to 89 degrees can be applied to the liquid crystal molecules 301. Accordingly, it is possible to operate the VA liquid crystal display device that controls the transmission of light from a back light by generating a vertical electric field between the pixel electrode 109 and the counter electrode 107 respectively shown in FIG. 16 and turning the liquid crystal molecule 301 without making a domain in which orientation is disordered.

Figure 17:
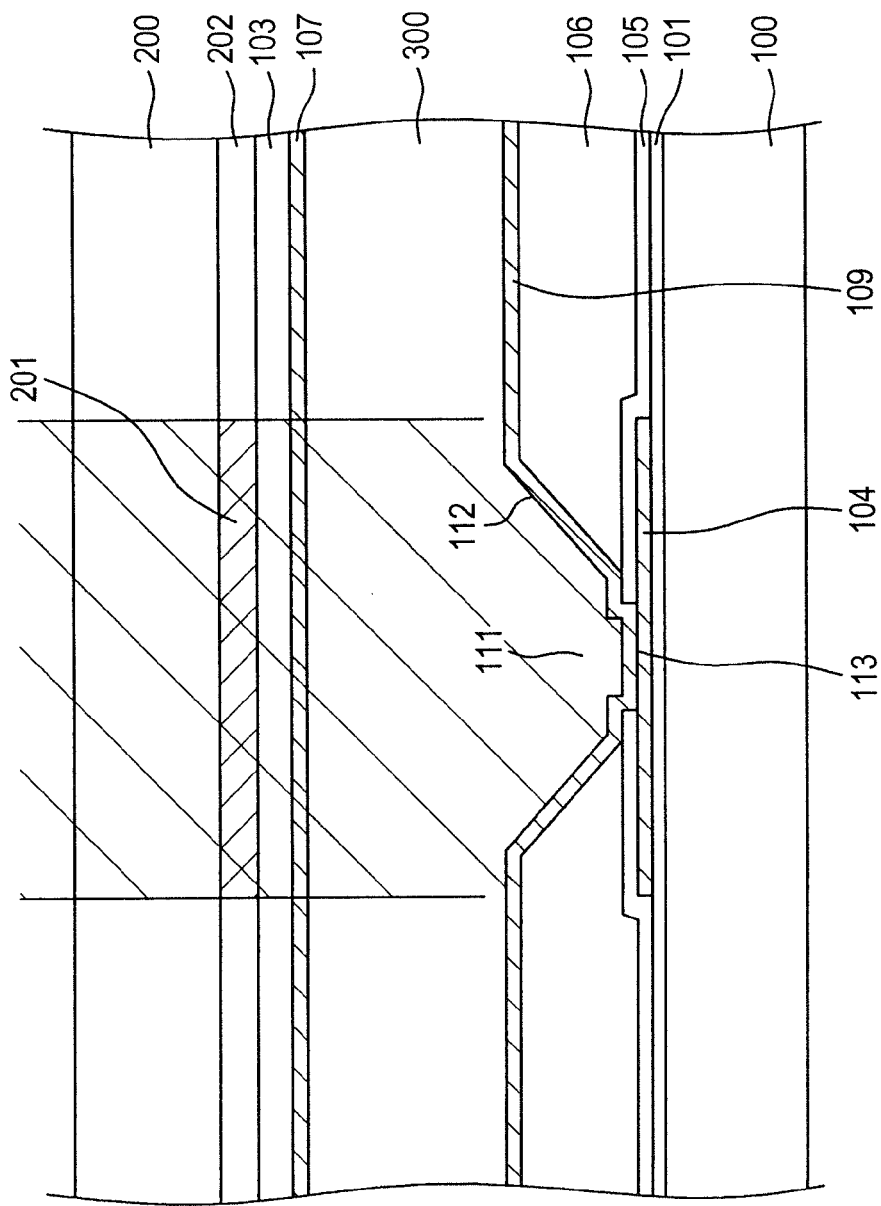
FIG. 17 is a sectional view showing a normal VA liquid crystal display device.

FIG. 17 is a sectional view showing a VA liquid crystal display device according to the related art. As shown in FIG. 17, a pixel electrode 109 is formed on an organic passivation film 106. An overcoat film 203 is formed on a counter electrode 107 with the overcoat film covering a black matrix 201 and a color filter 202, and the counter electrode 107 is formed on the overcoat film.

As shown in FIG. 17, since predetermined initial orientation cannot be applied to a liquid crystal molecule 301 in a contact hole 111 for connecting the pixel electrode 109 and a source electrode 104, the area of the source electrode 104 is increased to screen light from a back light. That is, transmissivity is reduced by the volume of the shaded part and luminance is deteriorated.

Figure 18:
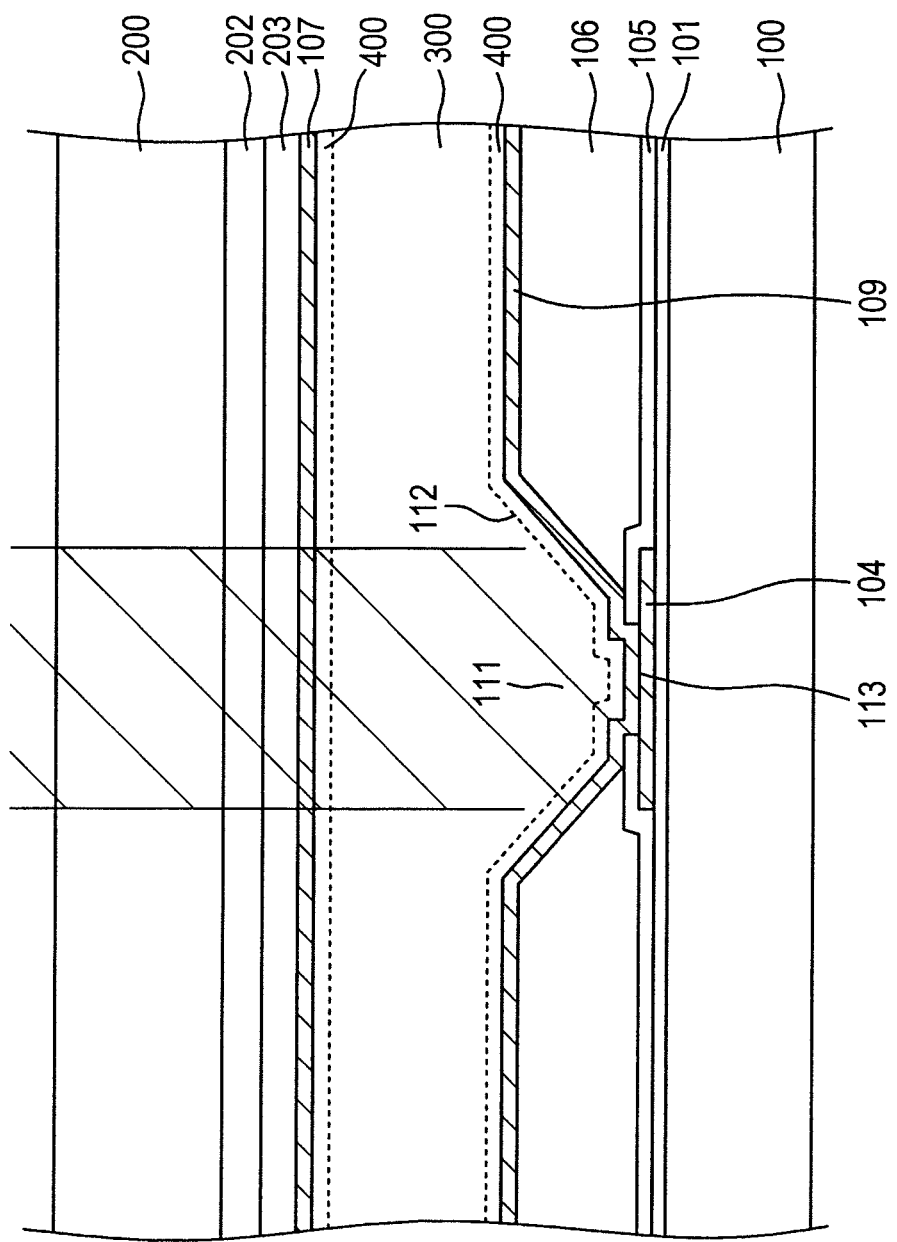
FIG. 18 is a sectional view showing a VA liquid crystal display device to which the present invention is applied.

FIG. 18 is a sectional view showing a VA method according to the present invention. The electrode structure in a pixel shown in FIG. 18 is similar to that shown in FIG. 17 except that a source electrode 104 is reduced. As shown in FIG. 18, an alignment material layer 400 is formed on a surface of a pixel electrode 109 and on a surface of a counter electrode 107, and a liquid crystal layer 300 is held between the alignment material layers 400. This configuration is already described in relation to FIG. 15. When voltage is applied between the pixel electrode 109 and the counter electrode 107, a liquid crystal molecule 301 having the negative anisotropy of the dielectric constant in the vicinity of a TFT substrate 100 is oriented by means of the effect of an electric field. In this state, when ultraviolet rays are radiated from the side of the TFT substrate 100 as described in relation to FIG. 16, the alignment material layer 400 is solidified, and the orientation of the liquid crystal molecules 301 in the vicinity of the TFT substrate 100 is fixed and initialized.

Figure 19:
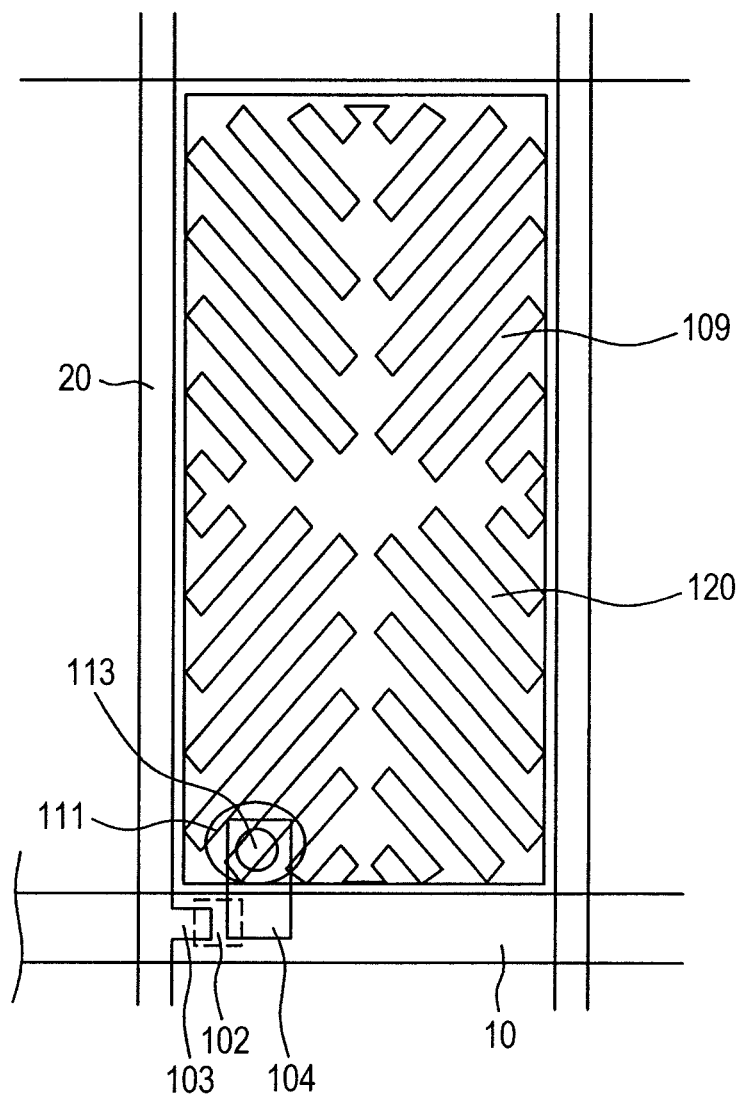
FIG. 19 is a plan showing the VA liquid crystal display device to which the present invention is applied.

This phenomenon is similar not only in electrode arrangement shown in FIG. 15 but in the contact hole 111 shown in FIG. 18. That is, the alignment material layer 400 is also formed inside the contact hole 111, and initial orientation is also applied to the liquid crystal molecule 301 inside the contact hole 111 in a state adapted to an electric field by applying voltage. Especially desirably, uniform liquid crystal initial orientation can also be stably applied to the inside of the contact hole by an electric field application process and the radiation of UV for initial orientation by also forming a slit electrode pattern inside the contact hole as shown in a plan in FIG. 19. Hereby, uniform liquid crystal orientation is also acquired inside the contact hole 111 without forming an orientation failure area, and therefore the contact hole can be used for a transmissible area for image formation. Further, it is desirable that a slit electrode pattern for initializing the orientation of liquid crystal by an electric field is also formed in a contact hole area.

Accordingly, in this embodiment, since the source electrode 104 is not required to be used for a shading film, the source electrode 104 also has only to have a minimum area for conduction in the contact hole area. Further, a black matrix 201 is not necessarily required to be formed in a part corresponding to the source electrode 104 of the counter electrode 107. As described above, transmissivity can be enhanced in the VA liquid crystal display device by applying the present invention, and the luminance of a screen can be enhanced.

What is claimed is:

1. A liquid crystal display device where a liquid crystal layer is held between a TFT substrate over which a pixel area and a pixel provided with a TFT are formed in a matrix and a counter substrate arranged opposite to the TFT substrate,
    wherein an organic passivation film is formed in the pixel area, a counter electrode is formed on the organic passivation film, an insulating film is formed on the counter electrode, a pixel electrode having a slit is formed on the insulating film, and an alignment film is formed over the pixel electrode;
    wherein the alignment film is responsive to optical orientation for orientation control thereof;
    wherein a contact hole for connecting the pixel electrode with a source electrode of the TFT is formed in the organic passivation film and is provided with a lower circumference having a contact portion, an upper circumference, a diameter of the upper circumference being larger than a diameter of the lower circumference, and an inner wall that fastens the lower circumference and the upper circumference;

wherein the lower circumference is delimited by an intersection of the contact hole with a plane parallel to the TFT substrate at distance d1 from a surface of the TFT substrate, and the upper circumference is delimited by an intersection of the contract hole with a plane parallel to the TFT substrate at distance d2 from the surface of the TFT substrate, where d2>d1, wherein each picture signal conductor has a first direction in an extending direction, a second direction in a width direction and a third direction in a thickness direction, wherein at least in the first direction, a part of the inner wall in the contact hole functions as a transmissible area for forming an image; and wherein, in the first direction, the source electrode has a size which enables the at least part of the inner wall in the contact hole to function as the transmissible area for forming the image.

2. The liquid crystal display device according to claim 1, wherein no black matrix is formed on the counter substrate in a part corresponding to the contact hole.

3. A liquid crystal display device according to claim 1, wherein the source electrode functions as a shading film, and the alignment film is responsive to light rays as the optical orientation.

4. A liquid crystal display device where a liquid crystal layer is held between a TFT substrate over which a pixel area and a pixel provided with a TFT are formed in a matrix and a counter substrate arranged opposite to the TFT substrate, wherein an organic passivation film is formed in the pixel area, a counter electrode is formed on the organic passivation film, an insulating film is formed on the counter electrode, a pixel electrode having a slit is formed on the insulating film, and an alignment film is formed over the pixel electrode;

wherein the alignment film is responsive to optical orientation for orientation control thereof;

wherein a contact hole for connecting the pixel electrode with a source electrode of the TFT is formed in the organic passivation film and is provided with a lower circumference having a contact portion, an upper circumference, a diameter of the upper circumference being larger than a diameter of the lower circumference, and an inner wall that fastens the lower circumference and the upper circumference, wherein the lower circumference is delimited by an intersection of the contact hole with a plane parallel to the TFT substrate at distance d1 from a surface of the TFT substrate, and the upper circumference is delimited by an intersection of the contract hole with a plane parallel to the TFT substrate at distance d2 from the surface of the TFT substrate, where d2>d1;

wherein each picture signal conductor has a first direction in an extending direction, a second direction in a width direction and a third direction in a thickness direction, wherein the contact hole is between the picture signal conductors; and wherein, in the first direction, a diameter of the upper circumference of the contact hole is larger than a diameter of the source electrode in a part corresponding to the contact hole.

5. The liquid crystal display device according to claim 4, wherein no black matrix is formed on the counter substrate in a part corresponding to the contact hole.

6. A liquid crystal display device according to claim 4, wherein the source electrode has a size which enables the at least part of the inner wall in the contact hole to function as a transmissible area for forming an image.

7. A liquid crystal display device where a liquid crystal layer is held between a TFT substrate over which a pixel area and a pixel provided with a TFT are formed in a matrix and a counter substrate arranged opposite to the TFT substrate, wherein a counter electrode is formed in the pixel area, an insulating film and/or an inorganic passivation film are/is formed on the counter electrode, a pixel electrode having a slit is formed on the insulating film and/or the inorganic passivation film, and an alignment film is formed over the pixel electrode;

wherein the alignment film is responsive to optical orientation for orientation control thereof;

a contact portion for connecting the pixel electrode with a source electrode of the TFT is formed in the insulating film and a stepped inclined area is provided on the upside of the contact portion, wherein the contact portion includes a contact hole;

wherein each picture signal conductor has a first direction in an extending direction, a second direction in a width direction and a third direction in a thickness direction, wherein the contact hole is between the picture signal conductors, and a diameter of the contact hole in the first direction is greater than a diameter of the source electrode in the first direction;

at least in the first direction, a part of the inclined area of the contact portion functions as a transmissible area for forming an image; and wherein, in the first direction, the source electrode has a size which enables the at least part of the inclined area of the contact portion to function as the transmissible area for forming the image.

8. The liquid crystal display device according to claim 7, wherein no black matrix is formed on the counter substrate in a part corresponding to the contact portion.

9. The liquid crystal display device according to claim 7, wherein no black matrix is formed on the counter substrate corresponding to at least a part of the source electrode.

10. A liquid crystal display device according to claim 7, wherein the source electrode functions as a shading film, and the alignment film is responsive to light rays as the optical orientation.

* * * * *